United States Patent Office 3,412,113
Patented Nov. 19, 1968

---

3,412,113
MIXED ANHYDRIDES OF ACYL-
PHOSPHONIC ACIDS
Steven J. Fitch, Beltsville, Md., and Riyad R. Irani,
Olivette, and Kurt Moedritzer, Webster Groves,
Mo., assignors to Monsanto Research Corporation,
St. Louis, Mo., a corporation of Delaware
No Drawing. Filed Oct. 22, 1965, Ser. No. 502,306
13 Claims. (Cl. 260—403)

ABSTRACT OF THE DISCLOSURE

Anhydrides of the formula

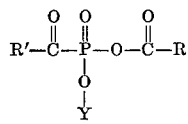

wherein R and R' are either alkyl of from 1 to 20 carbon atoms, phenyl or tolyl and Y is either alkyl of from 1 to 8 carbon atoms or —C(O)—R.

---

This invention relates to a new type of organophosphorus compounds and to the method of making the same. More particularly, there are provided novel phosphorus-containing anhydrides of the formula

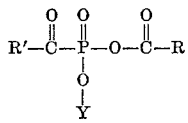

wherein R and R' are hydrocarbyl radicals which are free of olefinic and acetylenic unsaturation and contain from 1 to 20 carbon atoms, and Y is alkyl of from 1 to 8 carbon atoms or the acyl radical —C(O)—R wherein R is as defined above.

The above compounds are prepared by heating an acyl halide of the formula

where R is a hydrocarbyl radical which is free of olefinic and acetylenic unsaturation and contains from 1 to 20 carbon atoms, and X is halogen having an atomic weight greater than 19, with a dialkyl acylphosphonate of the formula

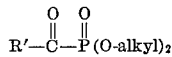

where R' is a hydrocarbyl radical which is free of olefinic and acetylenic unsaturation and contains from 1 to 20 carbon atoms, and alkyl has from 1 to 8 carbon atoms.

The dialkyl acylphosphonates are known compounds which are prepared by the reaction of an acyl chloride with a trialkyl phosphite as described by Ackerman et al., J. Am. Chem. Soc. 78, 4444 (1956), in his preparation of the diethyl acylphosphonates.

The anhydrides produced by this process contain either one or two acyl groups linked to phosphorus through oxygen, depending upon the ratio of the reactants, viz:

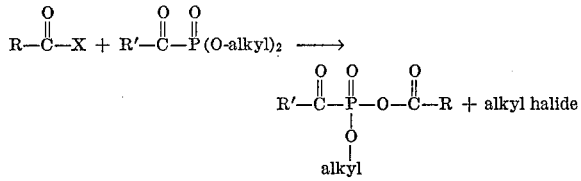

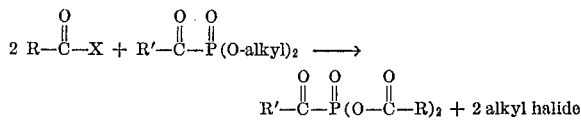

Where equal molar ratios of the acyl halide and the dialkyl acylphosphonate are employed, the product consists substantially of the monoanhydride. Where the acyl halide is employed in less than 1:1 ratio, the monoanhydride is also obtained, although, of course, in less than theoretical yield.

Where the molar ratio of acyl halide to dialkyl acylphosphonate is at least 2:1, the product consists substantially of the dianhydride.

Where the molar ratio of acyl halide to dialkyl acylphosphonate is between 1:1 and 2:1, there is formed a mixture of the mono- and dianhydrides.

The useful halides include chlorides, bromides or iodides. Examples thereof are acetyl chloride, acetyl bromide, acetyl iodide, propionyl chloride, n-butylryl chloride, isobutylryl chloride, n-valeryl chloride, isovaleryl bromide, n-hexanoyl chloride, n-octanoyl chloride, lauroyl chloride, myristoyl chloride, palmitoyl chloride, stearoyl chloride, cyclopentanecarbonyl bromide, benzoyl chloride, o-, m- or p-toluoyl chloride, phenylacetyl iodide, 3,5-dimethylbenzoyl chloride, etc.

The useful dialkyl acylphosphonates may have acyl groups derived from aliphatic, alicyclic or aromatic acids. Examples thereof are dimethyl acetylphosphonate, diethyl acetylphosphonate, diethyl propionylphosphonate, dimethyl capropylphosphonate, diethyl myristoylphosphonate, diethyl stearoylphosphonate, di-(n-propyl) stearoylphosphonate, dimethyl benzoylphosphonate, diethyl toluoylphosphonate, diethyl (cyclohexanecarbonyl)-phosphonate, etc.

Thus, reaction of acetyl chloride with dimethyl acetylphosphonate in molar ratio of 1:1 yields the methyl ester of mono-(acetic acid) anhydride of acetylphosphonic acid; if a molar ratio of 2:1 is employed, the product is essentially the di(acetic acid) anhydride of acetylphosphonic acid. Reaction of stearoyl chloride with diethyl stearoylphosphonate in a molar ratio of 2:1 yields the di(stearic acid) anhydride of stearoylphosphonic acid. Reaction of benzoyl chloride with dimethyl benzoylphosphonate in equimolar amounts yields the methyl ester of the mono-(benzoic acid) anhydride of benzoylphosphonic acid.

By first employing less than the equimolar quantity of acyl halide and thereafter reacting the monoanhydride thus obtained with a different acyl halide, there are provided mixed dianhydrides such as the mono-(acetic acid) mono-(stearic acid) anhydride of acetylphosphonic acid, the mono-(octanoic acid) mono-(myristic acid) anhydride of stearoylphosphonic acid, etc.

Reaction of the acyl halide with the dialkyl acylphosphonate takes place by heating the halide with the acylphosphonate. Temperatures of from, say, 50° C. to refluxing are useful. Generally, temperatures of from about 100° C. to 200° C. are advantageously employed.

The reactants are preferably stirred or shaken while heating. The separation of the conformed alkyl halide may be achieved by means of a suitable fractionating column. Where the reaction proceeds so vigorously that it is difficult to control, a diluent or solvent may be employed as a moderator. Examples of suitable diluents are hydrocarbons such as kerosene, xylene, etc. A catalyst may or may not be used.

All of the reaction conditions, e.g., whether or not diluent is employed and the nature of the diluent if one is used, temperature, etc., can be readily arrived at by easy experimentation. Progress of the reaction can be followed by sampling the reaction mixture at intervals and determining the content of the desired product, e.g., by boiling point, $P^{31}$ nuclear magnetic resonance, infrared spectroscopy, etc. To assure complete reaction in experimental runs, it is generally recommended that the temperature of the reaction mixture be increased after sufficient time has elapsed for any exothermic reaction to have occurred. Thus, arrival at optimum reaction conditions is simply a matter of routine procedure by one skilled in the art.

The products range from thin mobile liquids to waxy or crystalline solids. The liquids are generally high-boiling distillable liquids and are recoverable from the reaction mixture by fractional distillation. The solids may be isolated by extraction and/or fractional crystallization.

The presently provided acid anhydrides of acylphosphonic acids are latent acids, some being readily cleaved by moisture to form acids. They are therefore useful as acid catalysts, as for the preparation of melamine-formaldehyde resins, phenol-formaldehyde resins, furfuryl alcohol resins, etc. They are preferred over acids in that their conversion to acids is controllable by the amount of water present and by the temperature, so that the acidity desired for catalytic effect may be maintained at a useful level without developing excessive concentrations of acid which often cause undesirable side effects. Thus, small concentrations of these mixed anhydrides are useful catalysts for curing melamine resins on cloth in producing certain wash-fast finishes without unduly weakening or scorching the cloth from excess acidity. These anhydrides are reactive toward metal oxides and may be used as metal cleaners. When used in soldering pastes and fluxes, they serve to clean the metal surface and insure a well-bonded soldered joint. Those acid anhydrides which have long acyl chains are of utility as plasticizers, etc.

The invention is further illustrated by, but not limited to, the following examples:

Example 1.—Ethyl ester of mono(octanoic acid) anhydride of acetylphosphonic acid A mixture of 8.2 g. (0.05 mole) n-octanoyl chloride and 9.0 g. (0.05 mole) diethyl acetylphosphonate was heated to 180° C. over a period of one hour. During the heating, chloroethane was evolved to give as residue a product consisting mainly of the ethyl ester of mono-(octanoic acid) anhydride of acetylphosphonic acid, $CH_3C(O)P(O)(OC_2H_5)[OC(O)C_7H_{15}]$, with a small amount of the di(octanoic acid) anhydride of acetylphosphonic acid, as shown by $P^{31}$ nuclear magnetic resonance analysis.

Example 2.—Ethyl ester of mono(myristic acid) anhydride of myristoylphosphonic acid A mixture of 24.6 g. (0.10 mole) of myristoyl chloride and 34.8 g. (0.10 mole) of diethyl myristoylphophonate is heated with stirring at about 150° C. for three hours. During the heating, chloroethane is evolved, giving as a residue a product consisting mainly of the ethyl ester of mono(myristic acid) anhydride of myristoylphosphonic acid, $C_{13}H_{27}C(O)P(O)(OC_2H_5)[OC(O)C_{13}H_{27}]$, which is isolated as a crystalline solid. The chemical shift of the $P^{31}$ nuclear magnetic resonance is about —11 p.p.m. (referred to 85% $H_3PO_4$).

Example 3.—Ethyl ester of mono(benzoic acid) anhydride of acetylphosphonic acid

A mixture of 14.2 g. (0.10 mole) benzoyl chloride and 9.0 g. (0.05 mole) diethyl acetylphosphonate was heated to 180° C. over a period of one hour, followed by heating at 120–150° C. for two hours. During the heating, chloroethane is evolved, giving as a residue a mixture containing the ethyl ester of mono(benzoic acid) anhydride of acetylphosphonic acid, $$CH_3C(O)P(O)(OC_2H_5)[OC(O)C_6H_5]$$

as shown by $P^{31}$ nuclear magnetic resonance analysis.

Example 4.—Di(octanoic acid) anhydride of acetylphosphonic acid

A mixture of 16.4 g. (0.10 mole) n-octanoyl chloride and 9.0 g. (0.05 mole) diethyl acetylphosphonate was heated to 180° C. over a period of one hour. Liberation of chloroethane, starting at 120° C., gave as residue the substantially pure di(octanoic acid) anhydride of acetylphosphonic acid, $CH_3C(O)P(O)[OC(O)C_7H_{15}]_2$, as shown by $P^{31}$ nuclear magnetic resonance analysis.

Example 5.—Di(myristic acid) anhydride of myristoylphosphonic acid

A mixture of 24.6 g. (0.10 mole) myristoyl chloride and 17.4 g. (0.05 mole) diethyl myristoylphosphonate is heated with stirring at about 150° C. for three hours. During the heating, chloroethane is evolved, leaving a residue consisting mainly of the di(myristic acid) anhydride of myristoylphosphonic acid, $$C_{13}H_{27}C(O)P(O)[OC(O)C_{13}H_{27}]_2$$

which is isolated as a crystalline solid. The chemical shift of the $P^{31}$ nuclear magnetic resonance is about —8 p.p.m. (referred to 85% $H_3PO_4$).

Example 6.—Di(hexanoic acid) anhydride of benzoylphosphonic acid

A mixture of 26.8 g. (0.1 mole) hexanoyl chloride and 10.7 g. (0.05 mole) dimethyl benzoylphosphonate is heated at about 150° C. for three hours. During the heating, chloromethane is evolved, leaving a residue consisting mainly of the di(hexanoic acid) anhydride of benzoylphosphonic acid, $C_6H_5C(O)P(O)[OC(O)C_5H_{11}]_2$, as shown by $P^{31}$ nuclear magnetic resonance analysis.

It is to be understood that although the invention has been described with specific reference to particular embodiments thereof, it is not to be so limited since changes and alterations therein may be made which are within the full intended scope of this invention as defined by the appended claims.

We claim:

1. A compound of the formula $$R'-\overset{O}{\overset{\|}{C}}-\overset{O}{\underset{\underset{Y}{\overset{|}{O}}}{\overset{\|}{P}}}-O-\overset{O}{\overset{\|}{C}}-R$$

wherein R and R' are hydrocarbyl radicals selected from the group consisting of alkyl of from 1 to 20 carbon atoms phenyl and tolyl, and Y is selected from the group consisting of alkyl of from 1 to 8 carbon atoms and the acyl radical

—C(O)—R wherein R is as defined above.

2. A compound as defined in claim 1, further limited in that Y is alkyl of from 1 to 8 carbon atoms.

3. A compound as defined in claim 1, further limited in that Y is the radical —C(O)—R.

4. A compound as defined in claim 1, further limited in that Y is alkyl of from 1 to 8 carbon atoms, and R and R' are alkyl of from 1 to 20 carbon atoms.

5. A compound as defined in claim 1, further limited in that Y is alkyl of from 1 to 8 carbon atoms, R is phenyl or tolyl, and R' is alkyl of from 1 to 8 carbon atoms.

6. A compound as defined in claim 1, further limited in that Y is ethyl, R is n-heptyl, and R' is methyl.

7. A compound as defined in claim 1, further limited in that Y is ethyl, and R and R' are n-tridecyl.

8. A compound as defined in claim 1, further limited in that Y is ethyl, R is phenyl, and R' is methyl.

9. A compound as defined in claim 1, further limited in that Y is the radical —C(O)—R, and R and R' are alkyl of from 1 to 20 carbon atoms.

10. A compound as defined in claim 1, further limited in that Y is the radical —C(O)—R, and R' is phenyl or tolyl.

11. A compound as defined in claim 1, further limited in that Y is the radical —C(O)—$C_7H_{15}$, R is n-heptyl, and R' is methyl.

12. A compound as defined in claim 1, further limited in that Y is the radical —C(O)—$C_{13}H_{27}$, and R and R' are n-tricetyl.

13. A compound as defined in claim 1, further limited in that Y is the radical —C(O)—$C_5H_{11}$, R is n-pentyl, and R' is phenyl.

References Cited

Ackerman et al., JACS 78:4444–47, 1956.

NICHOLAS S. RIZZO, *Primary Examiner.*

J. A. NARCAVAGE, *Assistant Examiner.*

UNITED STATES PATENT OFFICE
CERTIFICATE OF CORRECTION

Patent No. 3,412,113          Dated November 19, 1968

Inventor(s) Steven J. Fitch, Riyad R. Irani & Kurt Moedritzer

It is certified that error appears in the above-identified patent and that said Letters Patent are hereby corrected as shown below:

Column 5, claim 12, line 9, "tricetyl" should be --- tridecyl ---.

Signed and sealed this 12th day of June 1973.

(SEAL)
Attest:

EDWARD M. FLETCHER, JR.　　　　　　ROBERT GOTTSCHALK
Attesting Officer　　　　　　　　　　Commissioner of Patents